(12) United States Patent
Wakutsu

(10) Patent No.: US 8,300,709 B2
(45) Date of Patent: Oct. 30, 2012

(54) METHOD OF PROCESSING VIDEO DATA AND WIRELESS COMMUNICATION APPARATUS

(75) Inventor: Takashi Wakutsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1069 days.

(21) Appl. No.: 12/238,648

(22) Filed: Sep. 26, 2008

(65) Prior Publication Data

US 2009/0074083 A1    Mar. 19, 2009

Related U.S. Application Data

(63) Continuation of application No. PCT/JP2007/055716, filed on Mar. 20, 2007.

(30) Foreign Application Priority Data

Mar. 28, 2006  (JP) ................................. 2006-087708

(51) Int. Cl.
H04N 7/26 (2006.01)
(52) U.S. Cl. ................................. 375/240.28
(58) Field of Classification Search .................. None
See application file for complete search history.

(56) References Cited

U.S. PATENT DOCUMENTS

| | | | |
|---|---|---|---|
| 7,561,582 B2 * | 7/2009 | Ohta et al. | 370/395.62 |
| 2003/0128686 A1 * | 7/2003 | Hur | 370/345 |
| 2004/0179523 A1 * | 9/2004 | Maruyama et al. | 370/389 |
| 2004/0186877 A1 | 9/2004 | Wang et al. | |
| 2004/0258039 A1 * | 12/2004 | Stephens | 370/349 |
| 2005/0117583 A1 | 6/2005 | Uchida et al. | |
| 2005/0213540 A1 * | 9/2005 | Matsumoto | 370/331 |
| 2005/0237434 A1 * | 10/2005 | Takatori et al. | 348/725 |
| 2005/0249175 A1 * | 11/2005 | Nasu et al. | 370/338 |
| 2009/0061874 A1 * | 3/2009 | Sao et al. | 455/436 |
| 2011/0023078 A1 | 1/2011 | Takatori et al. | |

FOREIGN PATENT DOCUMENTS

| | | |
|---|---|---|
| EP | 1 553 774 A1 | 7/2005 |
| JP | 9-9205 | 1/1997 |
| JP | 11-317768 | 11/1999 |
| JP | 2004-104701 A | 4/2004 |
| JP | 2005-167414 A | 6/2005 |
| JP | 2005-286414 A | 10/2005 |

(Continued)

OTHER PUBLICATIONS

T. Wakutsu, "IEEE802.11a Based Wireless AV Module (WAVM) with Digital AV Interface", Hot Chips Digest, vol. 16, Aug. 2004.

(Continued)

Primary Examiner — Thai Tran
Assistant Examiner — Sunghyoun Park
(74) Attorney, Agent, or Firm — Oblon, Spivak, McClelland, Maier & Neustadt, L.L.P.

(57) ABSTRACT

A method of processing video data includes allowing a counter to start counting, receiving the video data to which a timestamp is applied, checking the amount of video data in a buffer memory, comparing the timestamp with a count if the amount of video data in the buffer memory is smaller than a predetermined threshold, and discarding the video data if the timestamp is smaller than the count and accumulating the video data in the buffer memory if the timestamp is greater than the count. The counter uses a value corresponding to a time earlier than the timestamp by a delay time when the video data is initially received.

2 Claims, 10 Drawing Sheets

FOREIGN PATENT DOCUMENTS

| WO | WO 03/005674 A1 | 1/2003 |
|---|---|---|
| WO | WO 2004/008760 A1 | 1/2004 |

OTHER PUBLICATIONS

Japanese Office Action issued Apr. 5, 2011, in Patent Application No. 2006-087708 (with English-language translation).

Extended European Search Report issued Oct. 28, 2011, in Patent Application No. 07739159.7.

Andrei Gurtov, et al., "Lifetime Packet Discard for Efficient Real-Time Transport over Cellular Links", Mobile Computing and Communications Review, vol. 7, No. 4, XP 001503596, Oct. 1, 2003, pp. 32-45.

Mei-Hsuan Lu, et al., "Video Streaming Over 802.11 WLAN With Content-Aware Adaptive Retry", IEEE International Conference on Multimedia and Expo, XP 010844258, Jul. 6, 2005, pp. 723-726.

Nikolaos Laoutaris, et al., "Intrastream Synchronization for Continuous Media Streams: A Survey of Playout Schedulers", IEEE Network, vol. 16, No. 3, XP 011093506, May/Jun. 2002, pp. 30-40.

SangHoon Park, et al., "Network-Adaptive High Definition MPEG-2 Streaming over IEEE 802.11a WLAN using Frame-based Prioritized Packetization", WMASH, Proceedings of the $3^{rd}$ ACM International Workshop on Wireless Mobile Applications and Services on WLAN Hotspots, XP 002438283, Sep. 2, 2005, pp. 84-87.

\* cited by examiner

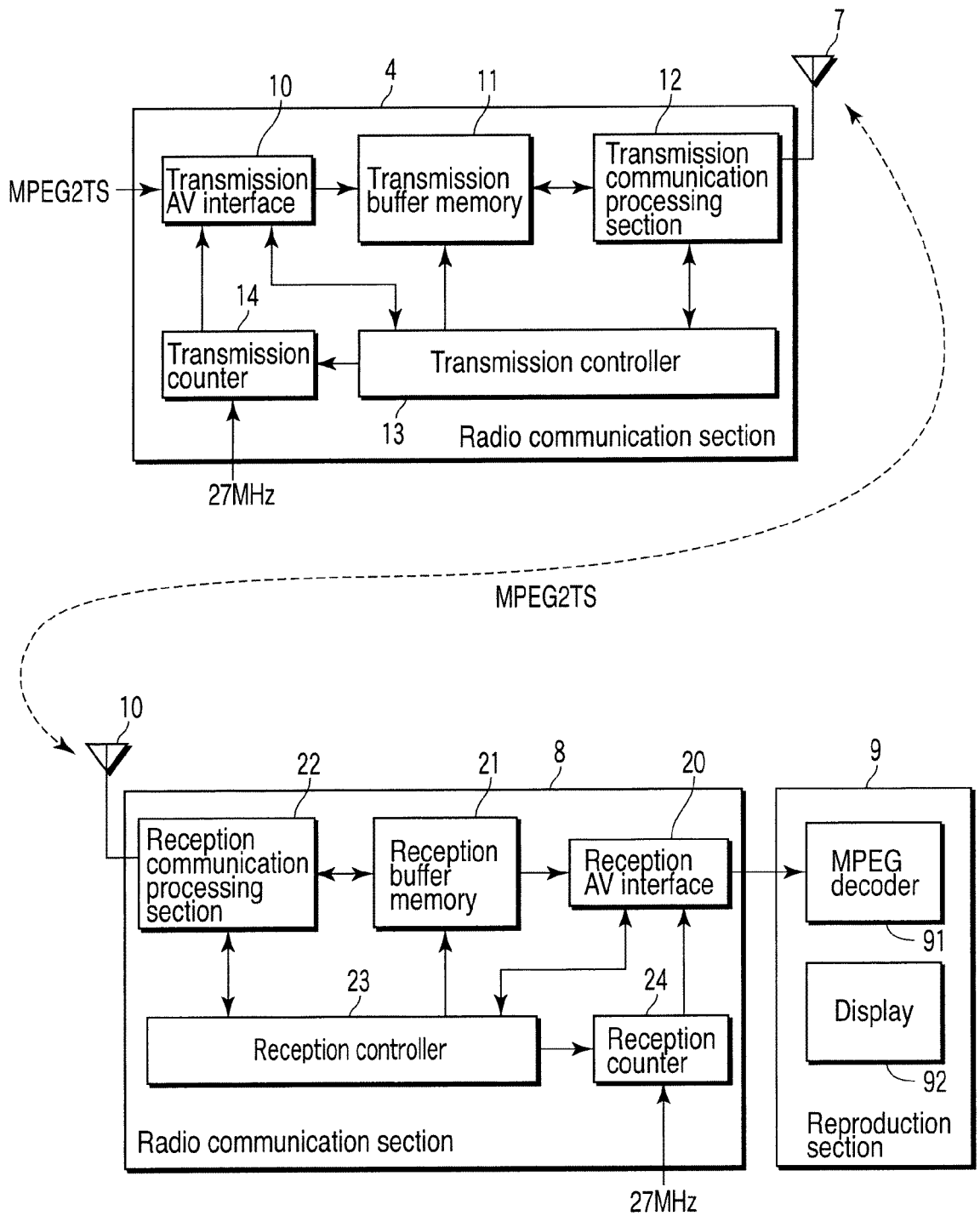
F I G. 3

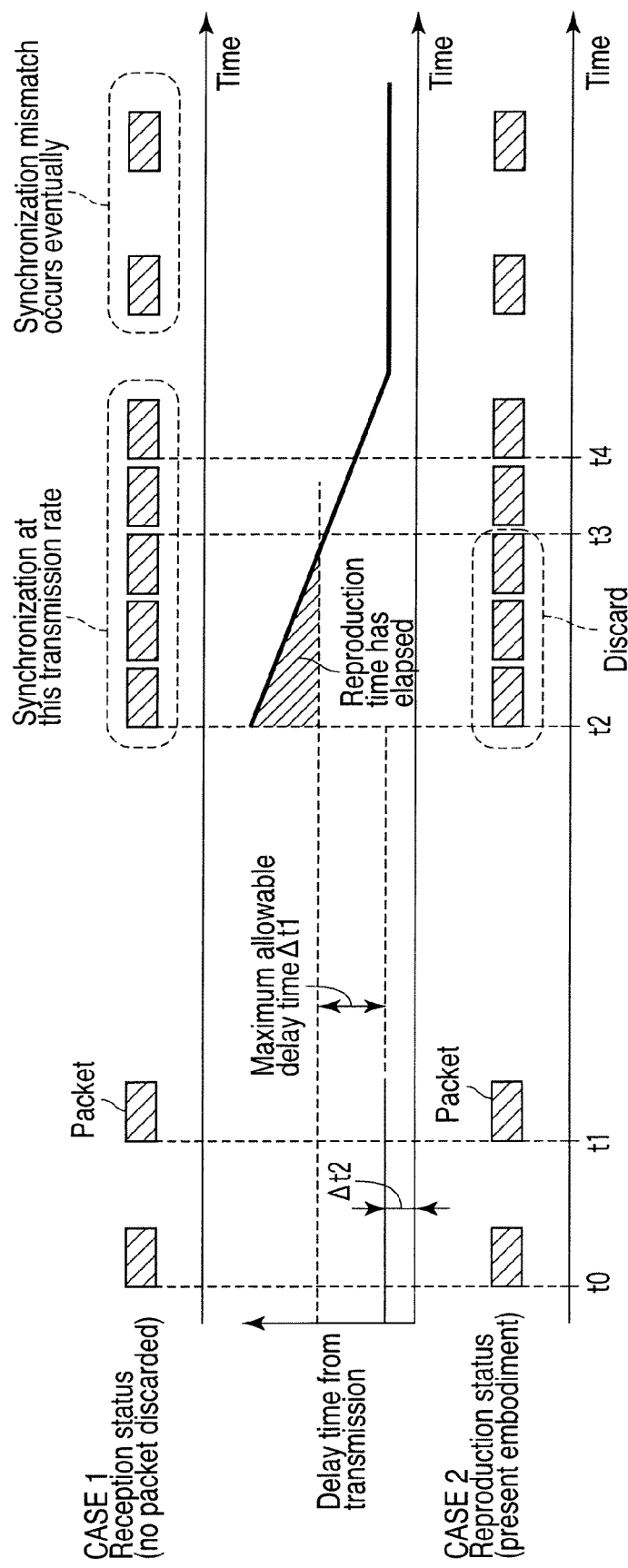
F I G. 7

METHOD OF PROCESSING VIDEO DATA AND WIRELESS COMMUNICATION APPARATUS

CROSS REFERENCE TO RELATED APPLICATIONS

This is a Continuation Application of PCT Application No. PCT/JP2007/055716, filed Mar. 20, 2007, which was published under PCT Article 21(2) in Japanese.

This application is based upon and claims the benefit of priority from prior Japanese Patent Application No. 2006-087708, filed Mar. 28, 2006, the entire contents of which are incorporated herein by reference.

BACKGROUND OF THE INVENTION

1. Field of the Invention

The present invention relates to a method of processing video data and a wireless communication apparatus. For example, the present invention relates to a method of transmitting and receiving video data by wireless communication.

2. Description of the Related Art

In recent years, increasing digitalization has resulted in the common use of Moving Picture Experts Group 2 Transport Stream (MPEG2-TS). Furthermore, wireless local area network (LAN) is suitable for video transmission because of the capability of transmitting information of a relatively wide band and easy availability. Thus, there has been a demand for realization of video transmission using the wireless LAN.

With a conventional video transmission method using the wireless LAN, a buffer memory is provided on a reception side. Transmitted video data is accumulated in the buffer memory. A method of absorbing a fluctuation in a delay in video data propagation is disclosed in, for example, Jpn. Pat. Appln. KOKAI Publication Nos. 2005-167414 and 2005-286414. This method allows videos to be reproduced without being stopped as long as the video data is accumulated in the buffer memory even if the condition of a wireless communication path is degraded.

However, according to the above-described method, if the degraded condition of propagation on the wireless communication path lasts a long time, the video data in the buffer memory is lost. Then, when the propagation condition is improved, all the video data that has failed to be transmitted so far is transmitted at a time. In this case, synchronization mismatch may disadvantageously occur in a reception decoder to distort reproduced videos.

BRIEF SUMMARY OF THE INVENTION

A method of processing video data using a wireless communication apparatus which reproduces a plurality of video data received over time wireless communication, a predetermined delay time after the reception and which includes a buffer memory temporarily accumulating video data the amount of which corresponds to the delay time, the method according to an aspect of the present invention includes:
  allowing a counter to start counting;
  receiving the video data to which a timestamp indicating a transmission time is applied;
  checking the amount of video data accumulated in the buffer memory;
  comparing the timestamp of the received video data with a count in the counter upon the reception of the video data if the amount of video data accumulated in the buffer memory is smaller than a predetermined threshold; and
  discarding the video data if the timestamp is smaller than the count and accumulating the video data in the buffer memory if the timestamp is greater than the count, and
  wherein upon initially receiving the video data, the counter starts counting using, as an initial value, a value corresponding to a time earlier, by the delay time, than the timestamp applied to the video data.

A wireless communication apparatus which is configured to transmit video data to a reception device by wireless communication, the reception device reproducing the video data a predetermined delay time after reception, the apparatus according to an aspect of the present invention includes:
  a counter which performs counting at a fixed frequency;
  a application circuit which applies a count in the counter to the video data to be transmitted, as a timestamp;
  a first buffer memory which temporarily accumulates the video data to which the timestamp is applied;
  a wireless communication circuit which transmits the video data accumulated in the first buffer memory, by wireless communication;
  a determination circuit which determines average amount of data accumulated in a second buffer memory provided in the reception device, the second buffer memory being configured to accumulate the video data;
  a calculation circuit which calculates the amount of video data to be transmitted per unit time; and
  a control circuit which calculates the amount of video data accumulated in the second buffer memory using the amount of video data calculated by the calculation circuit, the average accumulated data amount determined by the determination circuit, and the amount of video data having failed to be transmitted by the wireless communication circuit and which discards one item of the video data accumulated in the first buffer memory which has a timestamp equal to or older than the current count by a value corresponding to the delay time if the calculated accumulated data amount is smaller than a predetermined threshold.

BRIEF DESCRIPTION OF THE SEVERAL VIEWS OF THE DRAWING

FIG. 3 is a block diagram of a radio communication transmission section, a radio communication reception section, and a reproduction section according to the first embodiment;

FIG. 7 is a timing chart showing the flow of packets in the video transmission system according to the first embodiment, the flow of packets observed when packets for which reproduction time has elapsed are not discarded, and a delay time between transmission and reception of packets;

DETAILED DESCRIPTION OF THE INVENTION

Figure 1:
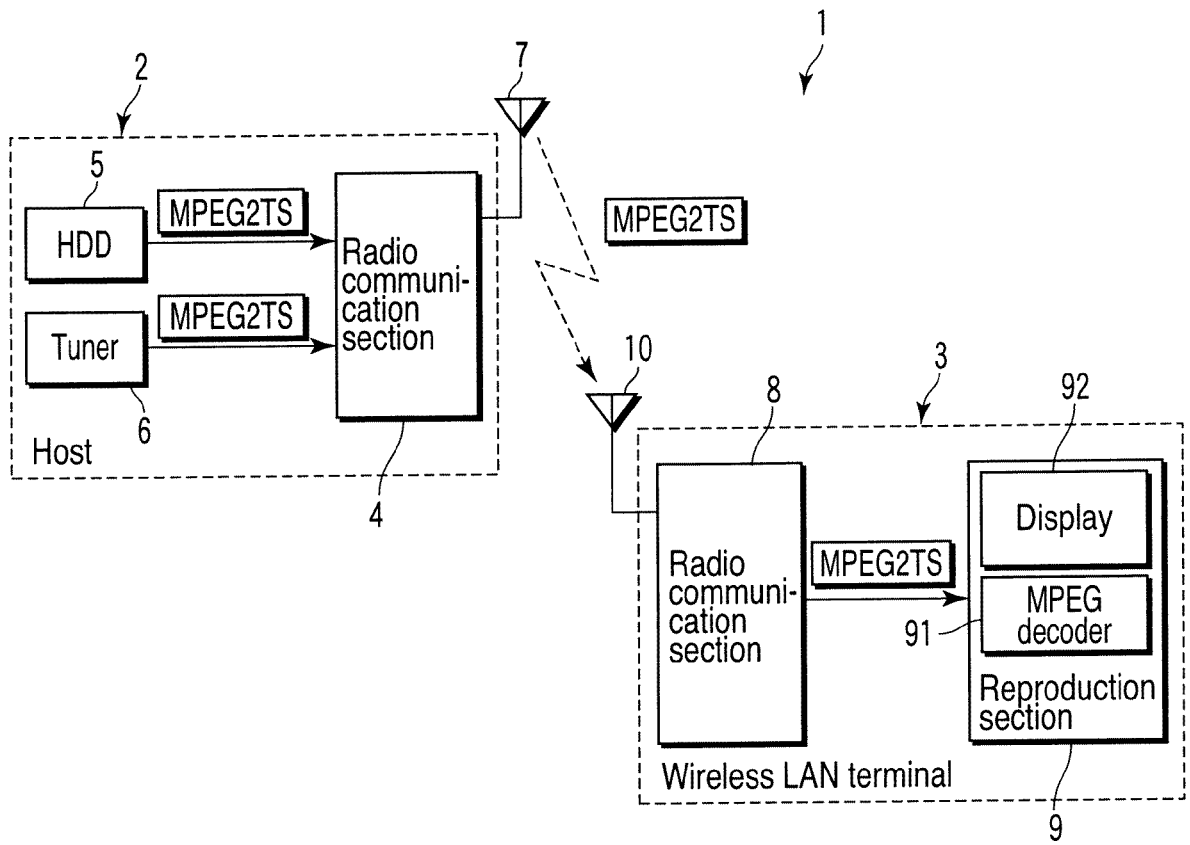
FIG. 1 is a block diagram of a video transmission system according to a first embodiment of the present invention.

Embodiments of the present invention will be described below with reference to the drawings. In the description, in all the drawings, the same components are denoted by the same reference numerals.

First Embodiment

A method of processing video data and a wireless communication apparatus according to a first embodiment of the present invention will be described with reference to FIG. 1. FIG. 1 is a block diagram of a video transmission system using a wireless LAN according to the present embodiment.

As shown in FIG. 1, the video transmission system 1 includes a host 2 serving as a wireless LAN base station (access point) and a wireless LAN terminal 3; the host 2 and the wireless LAN terminal 3 forms a communication network (LAN). The host 2 includes a radio communication section 4 and a hard disk 5 or a tuner 6. The hard disk 5 or the tuner 6 provides video data to the radio communication section 4 in an MPEG2-TS format. MPEG2-TS is a set of a plurality of packets flowing over time. The hard disk 5 or the tuner 6 may be replaced with a server connected to the system via LAN or an Internet line. The hard disk 5 or the tuner 6 is not limited provided that the hard disk 5 or the tuner 6 can distribute video data. The radio communication section 4 transmits the received MPEG2-TS from an antenna 7 to the wireless LAN terminal 3.

The wireless LAN terminal 3 includes a radio communication section 8 and a reproduction section 9. The radio communication section 8 receives MPEG2-TS transmitted by the host 2, through an antenna 10, and outputs packets to the reproduction section 9 at predetermined timings. The reproduction section 9 includes an MPEG decoder 91 and a display 92. The MPEG decoder 91 decodes the MPEG2-TS provided by the radio communication section 8 to reproduce videos. The display 92 displays the videos reproduced by the MPEG decoder 91.

Figure 2:
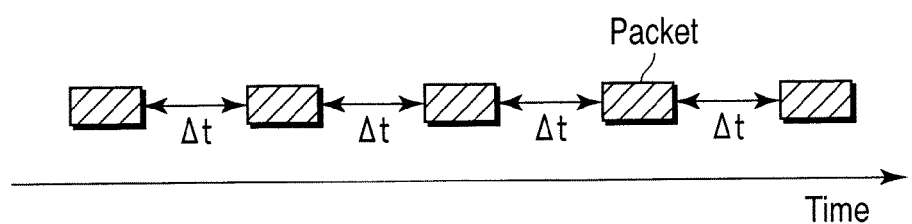
FIG. 2 is a timing chart showing the flow of packets in the video transmission system according to the first embodiment.

In the above-described configuration, the host 2 uses the wireless LAN to transmit video data to the wireless LAN terminal 3, which then reproduces the video data. In the description below, for convenience, the radio communication section 4 of the host 2 and the radio communication section 8 of the wireless LAN terminal 3 are referred to as the radio communication transmission section 4 and the radio communication reception section 8, respectively. FIG. 2 is a schematic diagram showing how MPEG2-TS is transmitted by the wireless LAN and how packets are transmitted over time. FIG. 2 shows that the condition of a wireless communication path is stable. In this case, the packets are sequentially transmitted from the host 2 to the wireless LAN terminal 3 at certain time intervals $\Delta t$. When the wireless communication path is degraded (transmission rate is decreased), the time intervals $\Delta t$ is increased.

Now, the detailed configurations of the radio communication transmission section 4 and the radio communication reception section 8 will be described with reference to FIG. 3. FIG. 3 is a block diagram of the radio communication transmission section 4 and the wireless LAN terminal 3. First, the radio communication transmission section 4 will be described.

As shown in FIG. 3, the radio communication transmission section 4 includes a transmission AV interface 10, a transmission buffer memory 11, a transmission communication processing section 12, a transmission controller 13, and a transmission counter 14. The transmission AV interface 10 receives MPEG2-TS from the hard disk 5 or the tuner 6, and applies a timestamp corresponding to a reception time to each packet. The transmission buffer memory 11 temporarily accumulates the packet to which the timestamp is applied. The transmission communication processing section 12 converts the packet read from the transmission buffer memory 11 into an analog signal and then transmits the analog signal from the antenna 7 to the wireless LAN terminal 3 by radio communication. The radio communication conforms to standards such as IEEE 802.11a/b/e/g. The transmission controller 13 controls the operation of the transmission AV interface 10, the transmission buffer memory 11, the transmission communication processing section 12, and the transmission counter 14. The transmission counter 14 starts counting up at a fixed frequency (for example, 27 MHz) when the transmission AV interface 10 receives the first packet of MPEG2-TS. The transmission counter 14 then outputs the count to the transmission AV interface 10. The timestamp applied by the transmission AV interface 10 corresponds to the count provided by the transmission counter 14.

Now, the radio communication reception section 8 will be described. As shown in FIG. 3, the radio communication section 8 includes a reception AV interface 20, a reception buffer memory 21, a reception communication processing section 22, a reception controller 23, and a reception counter 24. The reception communication processing section 22 receives MPEG2-TS transmitted by radio communication, through the antenna 10, and converts the received packet into digital data, and outputs the digital data to the buffer memory 21. The reception buffer memory 21 temporarily accumulates the packet received by the reception communication processing section 22. The reception AV interface 20 outputs the packet accumulated in the reception buffer memory 21, to the reproduction section 9 according to the count in the reception counter 24 and the timestamp. The reception controller 23 controls the operation of the reception AV interface 20, the reception buffer memory 21, the reception communication processing section 22, and the reception counter 24. The reception counter 24 starts counting up at a fixed frequency (for example, 27 MHz) when the reception communication processing section 22 receives the first packet. The reception counter 24 then outputs the count to the reception AV interface 20. Both the transmission counter 14 and the reception counter 24 counts up at the same frequency.

In the above-described configuration, when MPEG2-TS arrives at the radio communication transmission section 4, the current count in the transmission counter 14 is applied to the packet as a timestamp. The packet is subsequently stored in the transmission buffer memory 11. Upon determining that the packet has been received by the transmission AV interface 10 and stored in the transmission buffer memory 11, the transmission controller 13 instructs the transmission communication processing section 12 to transmit the packet to the wireless LAN terminal 3.

In the radio communication reception section 8, on the basis of the instruction from the reception controller 23, the packet received by the reception communication processing section 22 is stored in the reception buffer memory 21. The reception AV interface 20 then reads a packet with a timestamp equal to the count in the reception counter 24, from the reception buffer memory 21. The reception AV interface 20 then outputs the packet to the reproduction section 9. In the reproduction section 9, the MPEG decoder 91 decodes the received packet, so that the resulting reproduced video is displayed on the display 92.

The count in the reception counter 24 is smaller than that in the transmission counter 14. Thus, the reception buffer memory 21 has a capacity at which the number of packets at least corresponding to the difference between the counts can be accumulated. As a result, the wireless LAN terminal 3 starts reproducing the video data slightly later than a timing at which the host 2 transmits MPEG2-TS (this is hereinafter sometimes referred to as a maximum allowable delay time). This is to absorb timing jitter resulting from the degraded status of a wireless communication path for the wireless LAN (a decrease in transmission rate) to allow the reproduction section 9 to stably reproduce the video.

An initial count in the transmission counter 14 is set when transmission of the video data is started as described above. More specifically, the initial count in the reception counter 24 is set when the first packet is input to the transmission AV interface 10 as described above. An initial count in the reception counter 24 is set when reception of the video data is started. More specifically, the initial count in the reception counter 24 is set when the first packet is received by the reception communication processing section 22. At this time, the initial count in the reception counter 24 is set to a value obtained by subtracting the count corresponding to the maximum allowable delay time from the timestamp applied to the first packet received.

Figure 4:
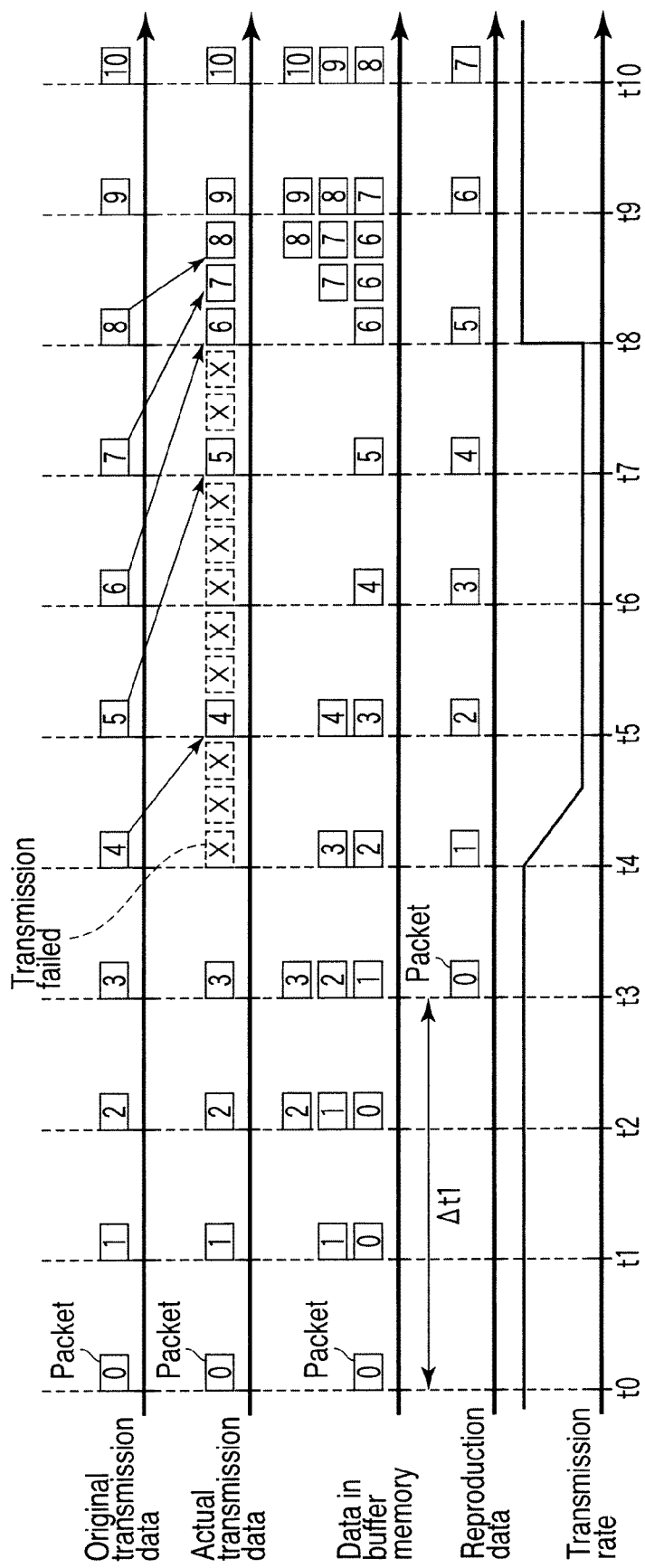
FIG. 4 is a timing chart showing packets and the transmission rate of a wireless LAN in the video transmission system according to the first embodiment.

The transmission and reception of video data by the video transmission system 1 will be simply described with reference to FIG. 4. FIG. 4 is a timing chart showing, at each point in time, packets to be originally transmitted, actually received packets, packets accumulated in the reception buffer memory, packets reproduced by the MPEG decoder, and the transmission rate of the wireless LAN. In FIG. 4, the packets are shown by outline rectangular marks enclosed by solid lines. Numbers inside the rectangles indicate the order in which the packets are transmitted. Hollow rectangular marks enclosed by dashed lines and containing crosses each indicate that the transmission of the corresponding packet has failed.

First, the 0th to 10th packets (hereinafter referred to as packets 0, 1, . . . , 10) are assumed to be originally transmitted at times t0 to t10. Furthermore, in the wireless LAN terminal 3, reproduction of video data is assumed to be started at time Δt1 later; time Δt1 corresponds to the period from times t0 to t3.

As shown in FIG. 4, immediately after the start of transmission of the data, the wireless communication path is assumed to be in a good condition (the transmission rate is high), so that the wireless LAN terminal 3 can receive packets 0 to 3 during times t0 to t3, respectively, without delay. The reception buffer memory 21 accumulates the packets for the maximum allowable delay time Δt1. At time t2, packets 0 to 2 are accumulated in the reception buffer memory 21. Packets 0 to 2 are not reproduced at this point in time. The reproduction of the video data is started at time t3, that is, time Δt1 after the reception. At time t3, the reception buffer memory 21 outputs packet 0 to the reproduction section 9, and packet 3 is stored in the reception buffer memory 21.

The condition of the wireless communication path is assumed to be degraded at time t4, so that transmission of packet 4 fails at time t4. Upon failing to transmit packet 4, the radio communication transmission section 4 attempts to retransmit packet 4. As a result, the transmission of packet 4 is assumed to succeed at time t5. However, since packets 1 to 3 are already accumulated in the reception buffer memory 21 at time t3, packet 1 can be output to the reproduction section 9 at time 4. The video data is thus accurately reproduced. Moreover, the transmission of packet 5 to be transmitted at time t5 is assumed to succeed at time t7. However, the packets are held in the reception memory buffer 21. Thus, between times t5 and t7, packets 2 to 4 are output to the reproduction section 9, which accurately reproduces the video data. Subsequently, at time t8, the condition of the wireless communication path is improved to allow the delayed packets 6 to 8 to be transmitted at a time between time t8 and time t9.

As described above, the maximum allowable delay time=Δt1, and the packet corresponding to Δt1 is held in the reception buffer memory 21. Thus, provided that a delay in the transmission of the packet is at most Δt1, the delay can be absorbed by the packets accumulated in the reception buffer memory 21. The video data can thus be correctly reproduced. That is, the maximum allowable delay time refers to the maximum packet delay time which ensures the correct video reproduction.

Figure 5:
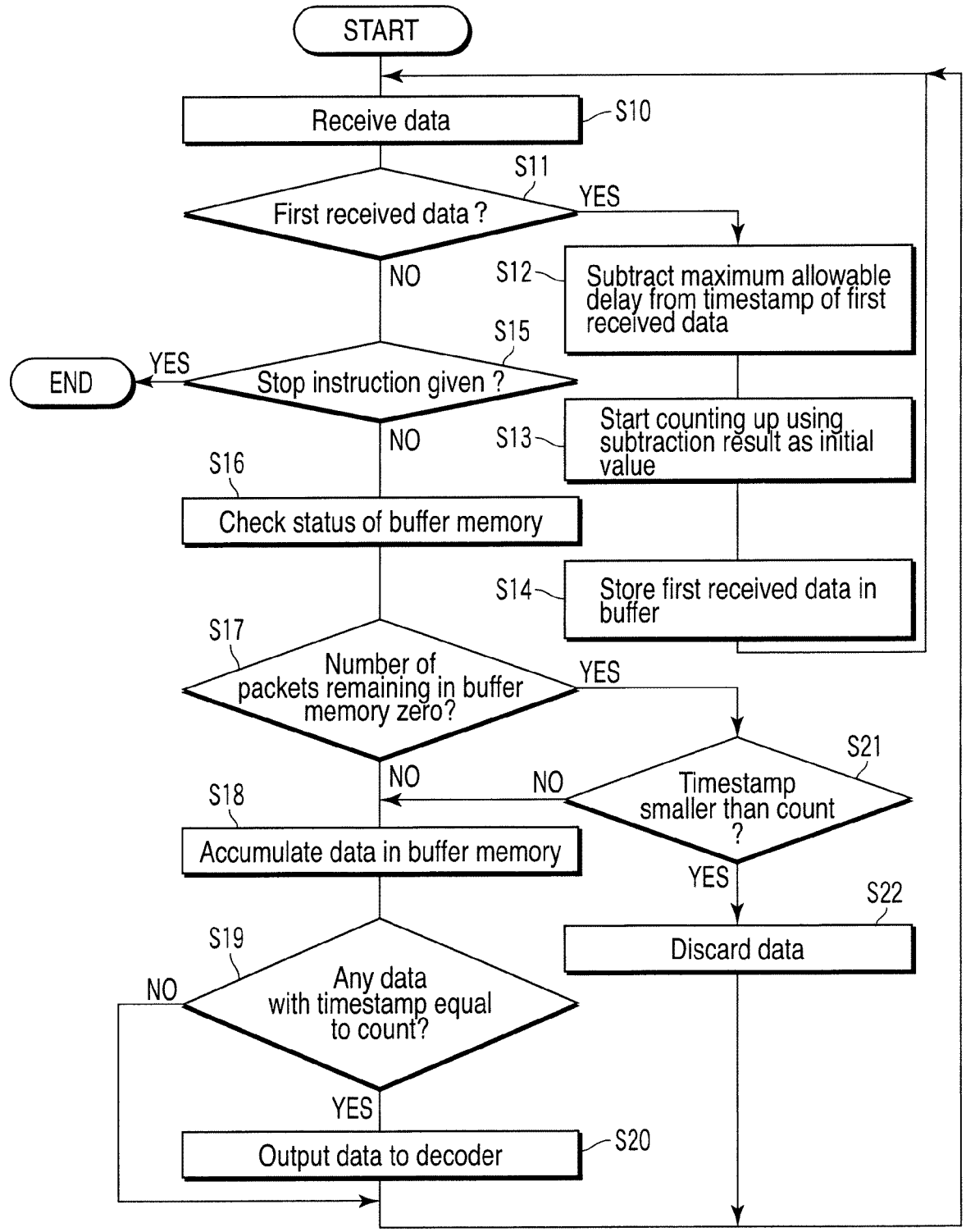
FIG. 5 is a flowchart of a method of processing video data in the radio communication reception section according to the first embodiment.
Figure 6:
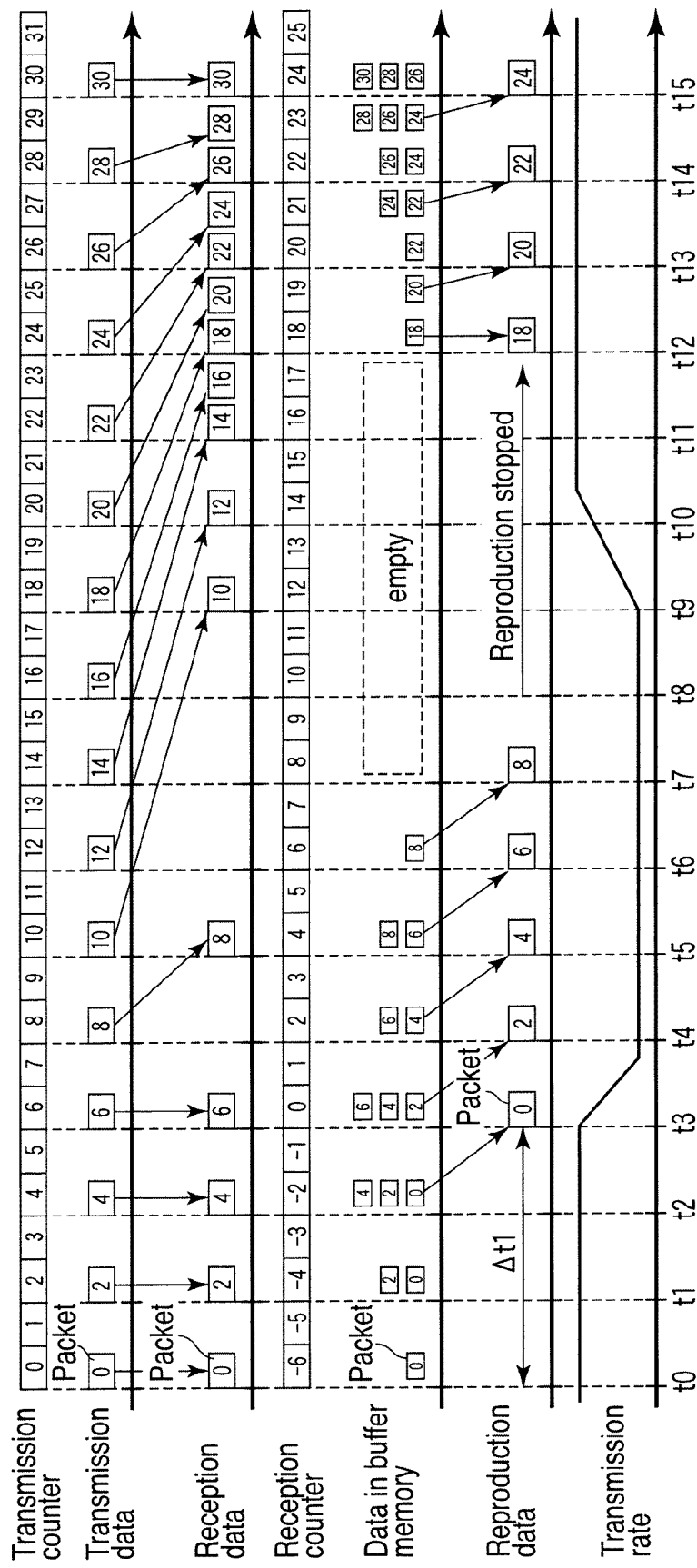
FIG. 6 is a timing chart showing a status of a transmission counter, a reception counter, packets and the transmission rate of the wireless LAN in the video transmission system according to the first embodiment.

Now, the operation of the radio communication transmission section 4 and the radio communication reception section 8 will be described in detail focusing particularly on the operation of radio communication reception section 8 performed when the number of packets remaining in the reception buffer memory 21 is zero. FIG. 5 is a flowchart of the operation of the radio communication reception section 8. Furthermore, FIG. 6 is a timing chart showing, at each point in time, the count in the transmission counter 14, packets to be originally transmitted, actually transmitted packets, the count in the reception counter 24, packets accumulated in the reception buffer memory 21, packets reproduced by the MPEG decoder, and the transmission rate of the wireless LAN. In the description below, for simplification, a signal delay occurred at the radio communication reception section 8 is neglected. In FIG. 6, the numbers in the packets indicate timestamps.

First, when the transmission AV interface 10 receives a packet, the transmission controller 13 recognizes the reception and instructs the transmission counter 14 to count up. The transmission AV interface 10 applies the count in the transmission counter 14 to the packet as a timestamp. As shown in FIG. 6, the packets are input to the AV interface 10 when the count in the transmission counter 14 is 0, 2, 4, 6, 8, . . . . Furthermore, a packet with a timestamp i (i=0, 2, 4, 6, . . . ) is hereinafter referred to as packet i.

At time t0, the first packet, packet 0, is transmitted from the radio communication transmission section 4 to the wireless LAN terminal 3. At this time, the wireless communication path is assumed to be in a good condition, so that packet 0 is transmitted to the wireless LAN terminal 3 without delay. When the radio communication reception section 8 receives the packet (step S10 in FIG. 5), the reception controller 23 determines whether or not the received packet is the first packet. Since packet 0 is the first packet (step S11, YES), the reception controller 23 subtracts a maximum allowable delay from the timestamp of the first packet (step S12). The maximum allowable delay is a count corresponding to the maximum allowable delay time Δt1, described with reference to FIG. 4. In FIG. 6, in terms of the count, the period Δt1 from times t0 to t3 corresponds to 6 counts from 0 to 5 (see the transmission counter in FIG. 6). Consequently, the reception controller 23 substrates the maximum allowable delay ("6") from the timestamp ("0") of packet 0. The reception counter 24 receives the subtraction result from the reception controller 23 and uses the subtraction result as an initial value to start counting up (step S13). That is, the reception counter 24 starts counting up from the count "−6" at time t0. Furthermore, received packet 0 is stored in the reception buffer memory 21.

Then, at time t1, packet 2 is received without delay (step S10). Since packet 2 is not the first packet (step S11, NO), the reception controller 23 determines whether or not an instruction to stop video reproduction has been issued (step S15). The instruction to stop video reproduction instructs the video reproduction to be stopped and is provided to the wireless LAN terminal 3 by the host 2. If the stop instruction has been issued (step S15, YES), the process is terminated. If the stop instruction has not been issued (step S15, NO), the reception controller 23 checks the status of the reception buffer memory 21 (step S16). More specifically, the reception controller 23 checks the number of packets accumulated in the reception buffer memory 21. At this point in time, packet 0 is accumulated in the reception buffer memory 21 (step S17, NO). The reception controller 23 thus stores packet 2 in the reception buffer memory 21 (step S18). Then, the reception AV interface 20 checks whether or not any of the packets accumulated in the reception buffer memory 21 has a timestamp equal to the current count in the reception counter 24 (step S19). At time t1, the count in the reception counter 24 is "−4". Packets 0 and 2 are held in the reception buffer memory 21. That is, no packet has a timestamp equal to the count (step S19, NO). The process thus returns to step S10.

Then, at time t2, packet 4 is received without delay (step S10). Processing carried out during the reception of packet 4 is similar to that carried out during the reception of packet 2. As a result, packets 0, 2, and 4 are accumulated in the reception buffer memory 21 and not output to the reproduction section 9 yet.

Then, at time t3, packet 4 is received without delay (step S10). Packet 4 is accumulated in the reception buffer memory 21 (step S18). Furthermore, at time t3, the count in the reception counter 24 is zero. Then, the timestamp of packet 0 matches the count (step S19, YES). The reception AV interface 20 thus reads packet 0 from the reception buffer memory 21 and outputs packet 0 to the MPEG decoder 91 of the reproduction section 9. Then, reproduction of packet 0 is started. That is, the packet reproduction is started time Δt1 (6 counts) after the reception of packet 0.

Then, after the reception of packet 6 at time t3, the status of the wireless communication path is assumed to be degraded, thus significantly reducing the transmission rate. Thus, packet 8 to be received at time t4 is assumed to be received at time t5 owing to a delay. The reception interface 20 carries out processing in steps S19 and S10 regardless of whether or not a packet has been received. Thus, at time t4, packet 2 with the timestamp equal to the count ("2") in the reception counter 24 is output to the reproduction section 9. The video is uninterruptedly reproduced. This also applies to times t5, t6, and t7.

Subsequently, the status of the wireless communication path is assumed to remain degraded, and packet 10 is assumed to be received at time t9. Then, at time t7, packet 8 is reproduced to empty the reception buffer memory 21. Thus, at time t8, the video reproduction is stopped. At time t9, packet 10 is received (step S10), and the reception controller 23 checks the status of the reception buffer memory 21. Then, as shown in FIG. 6, the number of packets remaining in the reception buffer memory 21 at time t9 is zero (step S17, YES). Consequently, the reception controller 23 compares the timestamp ("10") of the received packet 10 with the count ("12") in the reception counter 24 (step S21). The timestamp ("10") is smaller than the count ("12") (step S21, YES). That is, the time at which packet 10 is to be reproduced is passed at time t9. In this case, the reception controller 23 discards packet 10 without holding packet 10 in the reception buffer memory 21 (step S22). Of course, the video reproduction remains stopped.

Then, at time t10, packet 12 is received (step S10). The number of packets remaining in the buffer memory 21 is zero (step S17, YES), and timestamp ("12")<count ("14") (step S21, YES). Thus, the reception controller 23 discards packet 12 (step S22). The video reproduction remains stopped.

Between times t11 and t12, packets 14 and 16 are received (step S10). When packet 14 is received, the number of packets remaining in the buffer memory 21 is zero (step S17, YES), and timestamp ("14")<count ("16") (step S21, YES). Thus, the reception controller 23 discards packet 14 (step S22). The video reproduction remains stopped. When packet 16 is received, the number of packets remaining in the buffer memory 21 is zero (step S17, YES), and timestamp ("16") <count ("17") (step S21, YES). Thus, the reception controller 23 discards packet 17 (step S22). The video reproduction remains stopped.

Then, at time t12, packet 18 is received (step S10). When packet 18 is received, the number of packets remaining in the buffer memory 21 is zero (step S17, YES). However, the timestamp ("18") is not smaller than the count ("18") in the reception counter 24 (step S21, NO). Consequently, packet 18 is stored in the reception buffer memory 21 without being discarded. Furthermore, since the timestamp ("18") is equal to the count ("18"), the packet 18 is output to the reproduction section 9 (step S20). That is, at time t12, the packet received by the wireless LAN terminal 3 is in time for originally intended reproducing timing. Subsequently, similar processing is repeated until the stop instruction is given by the host 2.

As described above, with the video transmission system according to the first embodiment of the present invention, packets for which the maximum allowable delay time has elapsed before reception, that is, packets for which the reproduction time has elapsed, are discarded without being output to the reproduction section. Thus, a method of processing video data and a wireless communication apparatus can be provided which enable possible video distortion to be inhibited. This effect will be described below in detail. FIG. 7 is a timing chart showing the flow of packets and the delay time between the transmission and reception of the packets in cases where the packets for which the reproduction time has elapsed are not discarded (CASE 1) and where the packets for which the reproduction time has elapsed are discarded (CASE 2); the axis of abscissa indicates time.

As shown in FIG. 7, between time t0 and time t1, the status of the wireless communication path is stable. The packet is transmitted from the host 2 to the wireless LAN terminal 3 a delay time Δt2 after the originally intended time; the delay time Δt2 is shorter than the maximum allowable delay time Δt1. However, after time t1, the status of the wireless communication path is assumed to be extremely degraded, completely disabling the packet transmission. At time t2, the status of the wireless communication path is improved. Between time t2 and time t4, the packets having failed to be transmitted so far are received by the wireless LAN terminal 3 at a time. Between times t1 and t2, the number of packets remaining in the reception buffer memory 21 reaches zero. After time t4, the status of the wireless communication path is stabilized. The packet is transmitted delay time Δt2 after the originally intended time. In this status, the packets received between times t2 and t3 are received are received longer than the maximum allowable delay time Δt1 for the wireless LAN terminal 3 after the originally intended time. That is, each of the packets received during this period are received after the originally intended reproduction time.

For the above-described case, first, processing in CASE 1 will be described. After time t1, the packet reception is discontinued, and the number of packets remaining in the reception buffer memory 21 reaches zero. The video reproduction is stopped. Subsequently, reception of a large number of packets is started at time t2. In general, the MPEG decoder 91 reproduces the data while performing a synchronization operation using the time when each packet arrives and PCR counter information contained in the packet. The PCR counter is information contained in the video data and indicating reproduction timing. Thus, the packet having arrived at the MPEG decoder 91 later than the originally intended time is input to the MPEG decoder 91, the MPEG decoder 91 carries out the reproduction process while being synchronized with the late time. Then, after the MPEG decoder 91 starts the reproduction process while being synchronized with the late time, when the packets arrive at the MPEG decoder 91 later than time t4 at the originally intended transmission rate, synchronization mismatch occurs. As a result, even though the video is stopped and then recovered at time t2, the synchronization mismatch may disadvantageously eventually distort the reproduced video.

In this connection, in CASE 2, that is, in the present embodiment, the packets received between times t2 and t3 are discarded. Consequently, the packets for which the originally intended reproduction time has elapsed are prevented from being input to the MPEG decoder 91. That is, the MPEG decoder 91 can be prevented from performing the synchronization operation at incorrect timings. Therefore, the MPEG decoder 91 always carries out the reproduction process at a fixed timing to enable prevention of possible video distortion when the stopped video is recovered.

Second Embodiment

Figure 8:
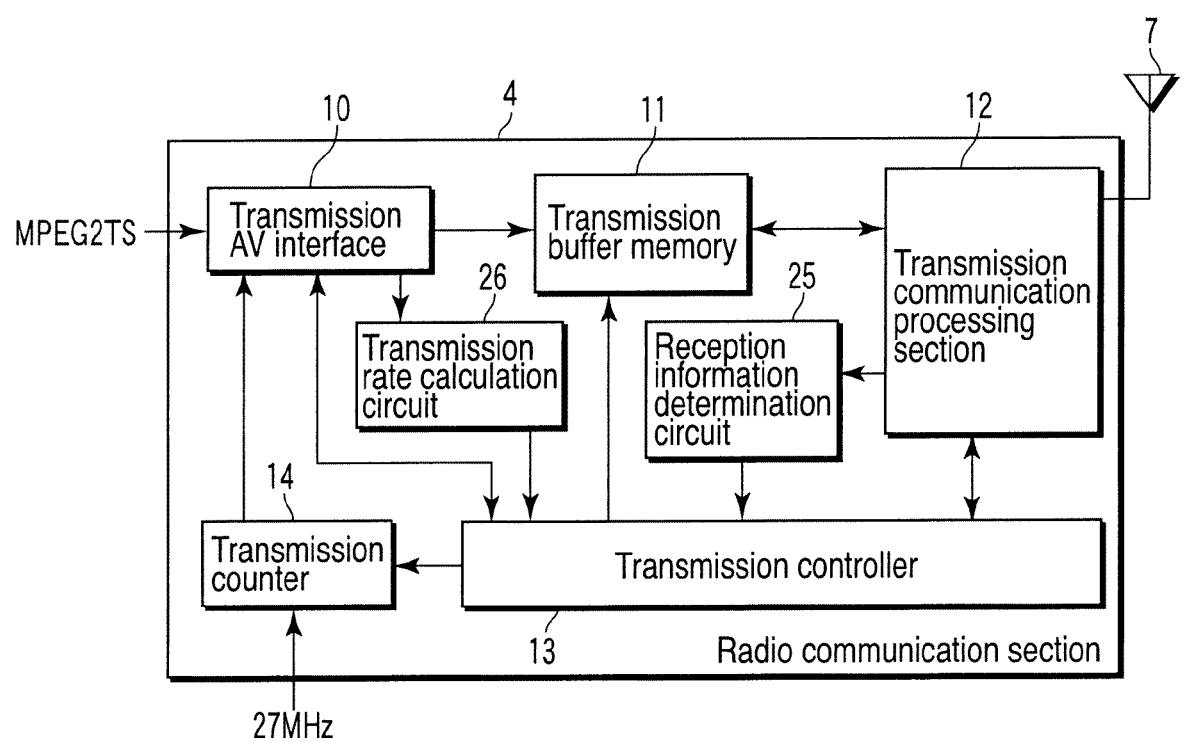
FIG. 8 is a block diagram of a radio communication transmission section according to a second embodiment of the present invention.

Now, a method of processing video data and a wireless communication apparatus according to the second embodiment will be described. In the present embodiment, the process of discarding video data according to the first embodiment is carried out by the radio communication transmission section 4. FIG. 8 is a block diagram of the radio communication transmission section 4 according to the present embodiment. The configuration of the radio communication reception section 8 is similar to that in the first embodiment. The configuration of the video transmission system 1 corresponds to the video transmission system 1 according to the first embodiment in which the radio communication transmission section 4 is replaced with an arrangement shown in FIG. 8. The configuration of the video transmission system 1 will thus not be described below.

As shown in FIG. 8, the radio communication transmission section 4 corresponds to the configuration in FIG. 3 described in the first embodiment and which further includes a reception information determination circuit 25 and a transmission rate calculation circuit 26. The reception information determination circuit 25 determines the average data amount of video data accumulated in the reception buffer memory 21. The reception information determination circuit 25 determines the average data amount and not the memory size of the reception buffer memory 21. The average data amount may be, for example, provided by the radio communication reception section 8 or previously prepared for the transmission system 1. As will be understood, the maximum average data amount corresponds to the maximum allowable delay time.

The transmission rate calculation circuit 26 counts the number of packets input to the transmission AV interface 10; the packet being input at predetermined time intervals. The transmission rate calculation circuit 26 calculates the transmission rate per unit time on the basis of the number of packets and the time intervals.

In addition to performing the operations described in the first embodiment, the transmission communication processing section 12 outputs re-tryout information to the transmission controller 13. As described in the first embodiment, upon failing to transmit any packet, the transmission communication processing section 12 attempts to retransmit the packet a specified number of times. If the attempt to retransmit the packet also results in a failure, the transmission failure is called re-tryout information.

The operation of the transmission controller 13 will be described below in detail.

Now, the operation of the radio communication transmission section 4 will be described with reference to a flowchart in FIG. 9. The operation of the radio communication reception section 8 corresponds to the operation described in the first embodiment and from which the processing in steps S16, S17, S21, and S22 is omitted.

Figure 9:
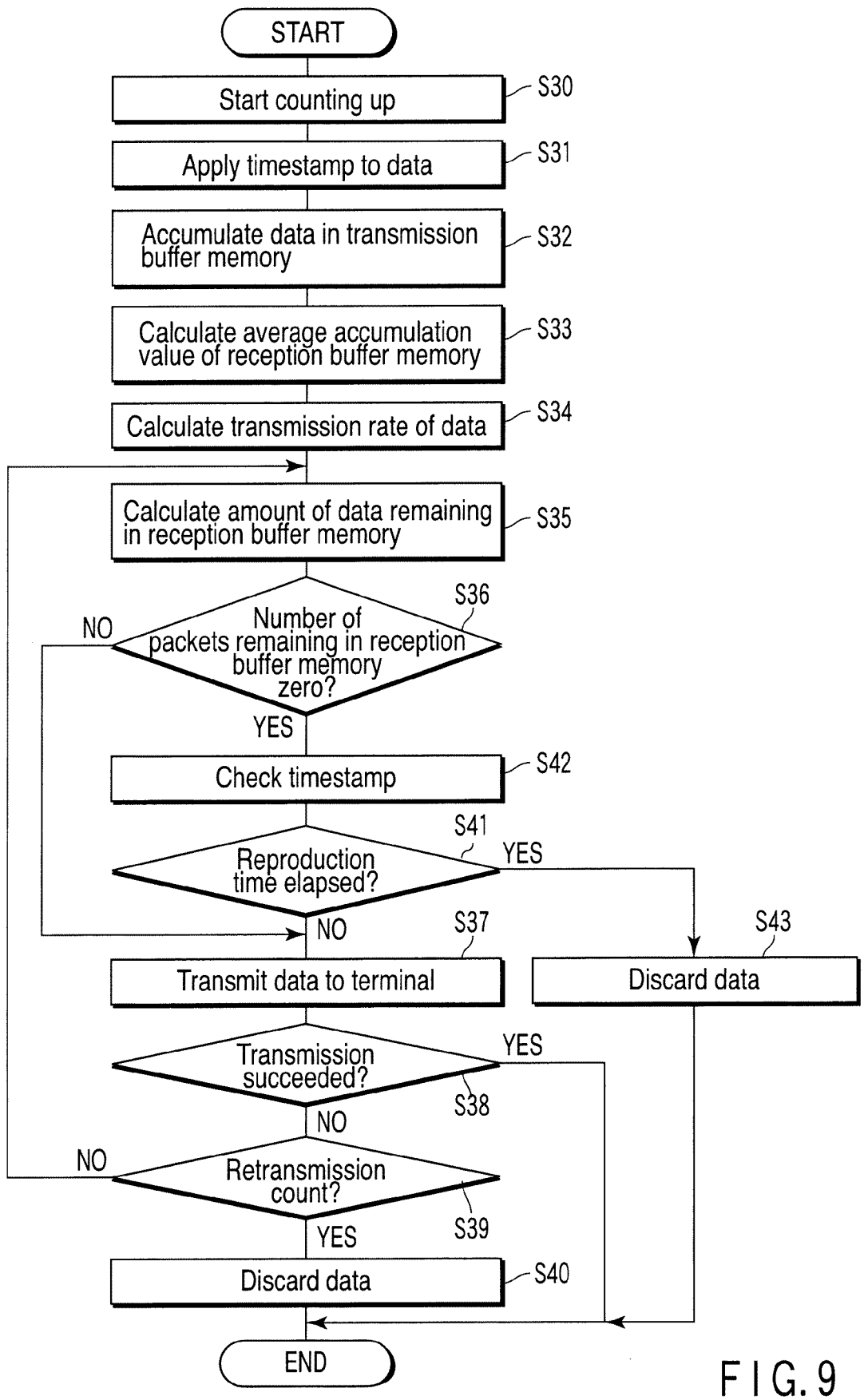
FIG. 9 and FIG. 10 are flowcharts of a method of processing video data in the radio communication transmission section according to the second embodiment.

As shown in FIG. 9, when the transmission AV interface 10 receives a packet, the transmission controller 13 recognizes the reception and instructs the transmission counter 14 to count up. In response to the instruction, the transmission counter 14 starts counting up (step S30). The transmission AV interface 10 applies the count in the transmission counter 14 to the packet as a timestamp (step S31). The processing from the beginning through step S31 is as described in the first embodiment.

The packet to which the timestamp is applied is temporarily held in the transmission buffer memory 11 (step S32). Furthermore, the reception information determination circuit 25 calculates the average memory size B [bytes] used to accumulate packets in the reception buffer memory (step S33). Moreover, the transmission rate calculation circuit 26 calculates the number R [number/sec] of packets transmitted per unit time (step S34).

The transmission controller 13 checks the number of packets remaining in the reception buffer memory 21 (step S35). That is, the transmission controller 13 determines whether or not the number of packets remaining in the reception buffer memory 21 is zero. This can be calculated on the basis of the average memory size B, the number R of packets transmitted per unit time, and the re-tryout information. That is, the average value B is maintained by transmitting R packets per unit time. Thus, the number of packets remaining in the reception buffer memory 21 can be calculated on the basis of the number of the R packets which have failed to be transmitted relative to the average value B.

If as a result of step S35, the number of packets remaining in the reception buffer memory 21 is not zero (step S36, NO), the transmission controller 13 instructs the transmission communication processing section 12 to transmit one of the packets in the transmission buffer memory 11 to the wireless LAN terminal 3 (step S37). If the transmission succeeds (step S38, YES), the processing is completed on the packet, and similar processing is carried out on the next packet. If the transmission fails (step S38, NO), the transmission communication processing section 12 checks whether or not a maximum retransmission count has been reached. The maximum retransmission count is the maximum number of packets retransmitted as described above. If the maximum retransmission count has been reached (step S39, YES), the packet is discarded. If the maximum retransmission count has not been reached (step S39, NO), the process returns to step S35. That is, the retransmission is repeated unless the number of packets remaining in the reception buffer memory is zero, and in case that the number of packets remaining in the reception buffer memory is zero unless the reproduction time for the packet has elapsed (step S41). The details of step S41 will be described below. The process returns to step S35 because even during the retransmission, the wireless LAN terminal 3 reproduces the video using the packets in the reception buffer memory.

Upon determining in step S36 that the number of packets remaining in the reception buffer memory 21 is zero (step S36, YES), the transmission controller 13 checks the timestamp applied to the packet (step S42). If the timestamp indicates that the reproduction time originally intended for the packet has elapsed (step S41, YES), in other words, if the maximum allowable delay time has already elapsed, the transmission controller 13 discards the packet (step S43). If the maximum allowable delay time has not elapsed yet (step S42, NO), the transmission controller 13 instructs the transmission communication processing section 12 to transmit the packet to the wireless LAN terminal 3 (step S37).

Figure 10:
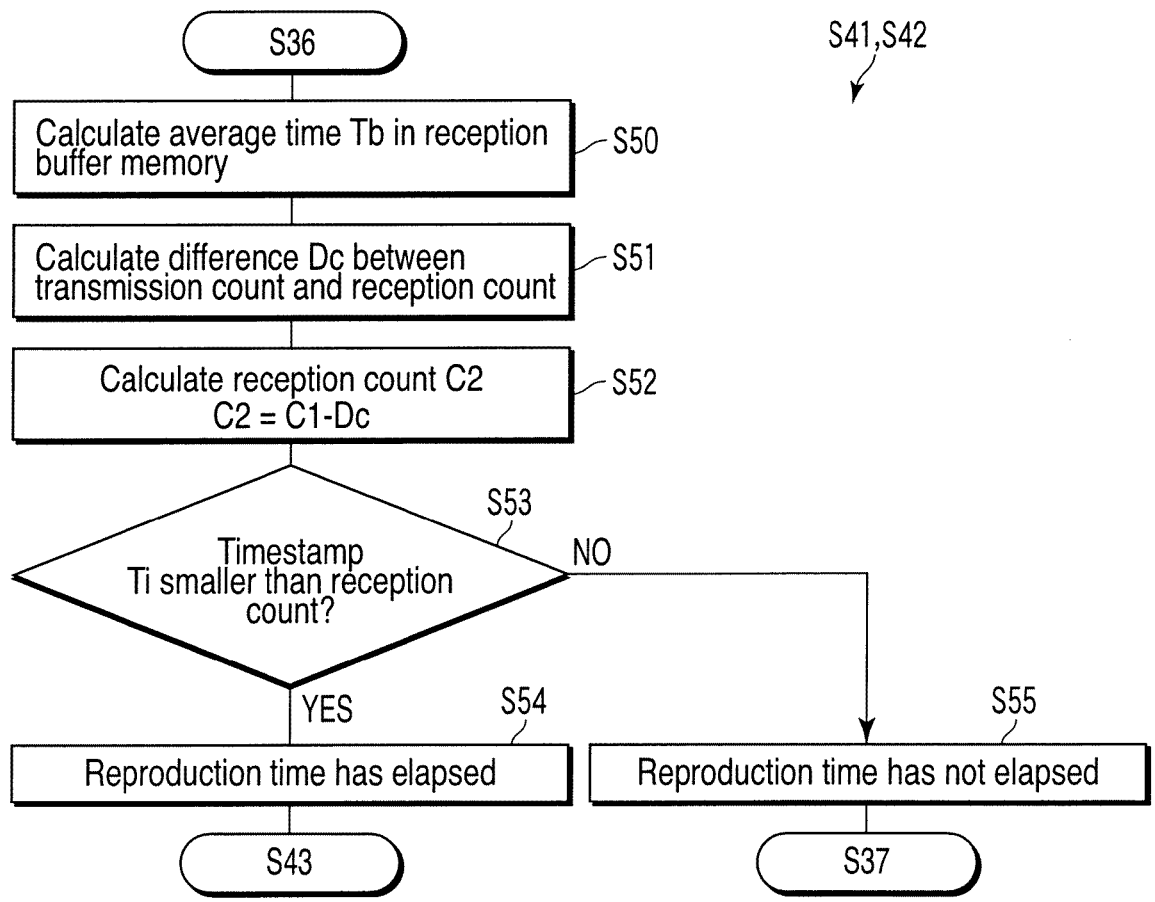

The processing in steps S42 and S41, described above, will be described in detail with reference to FIG. 10. FIG. 10 is a flowchart showing steps S42 and S41 in detail. First, a time Tb corresponding to the average amount B [bytes] of video data accumulated in the reception buffer memory 21 is calculated (step S50). Given that the size of one packet is S[bytes], the time Tb is expressed by:

$$Tb = B/(S \times R) [\text{sec}]$$

Then, the transmission controller 13 calculates a difference Dc between the count in the transmission counter 14 and the count in the reception counter 24 (step S51). The count in the reception counter 24 is set smaller than that in the transmission counter 14 by a count corresponding to the number of packets accumulated in the reception buffer memory as described in the first embodiment. Thus, when the operation clock frequency of the counters 14 and 24 is defined as f[MHz], the difference Dc is expressed by:

$$Dc = Tb/(f \times 10^6) = B/(S \times R \times f \times 10^6)$$

Then, the transmission controller 13 calculates the relationship between count C1 in the transmission counter 14 and count C2 in the reception counter 24 (step S52). When a packet propagation delay in the radio communication reception section 4 is neglected, that is, the time from the reception of a packet until the actual output of the packet from the reception AV interface 20 via the reception buffer memory 21 is neglected, count C2 in the reception counter 14 is expressed by:

$$C2 = C1 - Dc = C1 - B/(S \times R \times f \times 10^6)$$

Then, with reference to the timestamp applied to the packet, the transmission controller 13 compares the timestamp Ti with reception count C2 (step S53). If the timestamp Ti is smaller than count C2 in the reception counter, the transmission controller determines that the reproduction time originally intended for the packet has already elapsed (step S54). The process thus proceeds to step S43. If the timestamp Ti is not smaller than count C2 in the reception counter, the transmission controller determines that the reproduction time originally intended for the packet has not elapsed yet (step S55). The process thus proceeds to step S37.

A specific example of the above-described steps S52 to S54 will be described by taking packet 10 at time t9 in FIG. 6 by way of example. First, the counter difference Dc is "6" (step S51). Then, reception count C2 can be calculated to be C1 ("18")–"6"="12" (step S52). The timestamp ("10") of packet 10 is smaller than reception count C2 ("12") (step S53, YES). Consequently, at time t9, packet 10 is discarded without being transmitted.

As described above, in the transmission system 1 according to the present embodiment, the radio communication transmission section 4 determines whether the packet in the transmission buffer memory 11 is packet for which the reproduction time has elapsed or not. The packet for which the reproduction time has elapsed is discarded, and only the packet for which the reproduction time has elapsed is transmitted to the wireless LAN terminal 3. Consequently, synchronization mismatch in the wireless LAN terminal can be prevented. That is, the second embodiment exerts effects similar to those of the first embodiment.

Furthermore, in the present embodiment, the host 2 determines whether or not the packet is old. This enables a reduction in loads on the wireless LAN terminal 3. In particular, if the system 1 includes a plurality of wireless LAN terminals 3, the costs of the system 1 can be reduced.

Third Embodiment

Now, a method of processing video data and a wireless communication apparatus according to a third embodiment of the present invention will be described. The present embodiment relates to the control of the number of packet retransmissions in the radio communication transmission section 4 according to the first and second embodiments. Thus, the configuration of the radio communication transmission section 4 and the radio communication reception section 8 is similar to that in the first and second embodiments. The method of transmitting packets is also similar to that in the first and second embodiments. Accordingly, the configuration and the method will not be described below.

Figure 11:
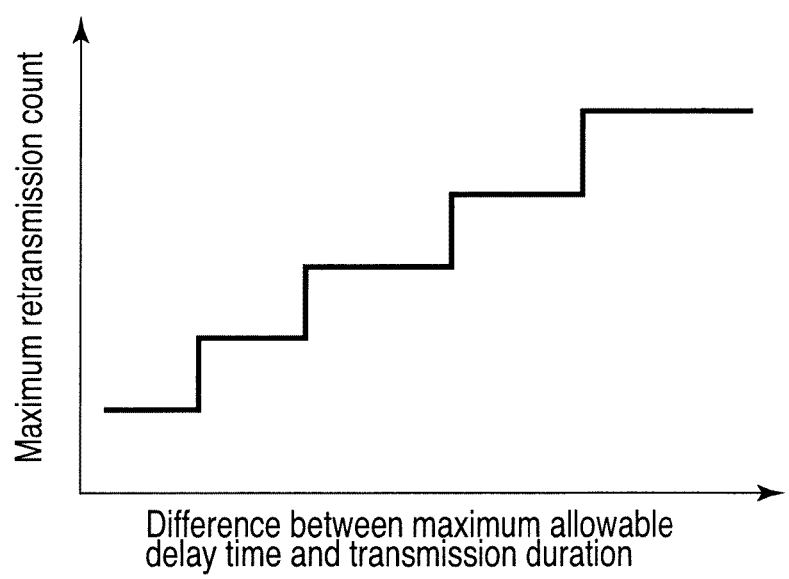
FIG. 11 is a graph showing the relationship between a maximum retransmission count and the difference between a maximum allowable delay time and a transmission duration, in a video transmission system according to a third embodiment of the present invention.

FIG. 11 is a graph showing the relationship between the maximum retransmission count and the difference between the maximum allowable delay time and a time required for transmission, in the radio communication transmission section 4 according to the present embodiment. As shown in FIG. 11, the set maximum retransmission count increases consistently with the difference between the maximum allowable delay time and the time required for transmission. The maximum allowable delay time corresponds to the number of packets accumulated in the reception buffer memory 21 as described above, and is also the maximum absorbable timing jitter. That is, the maximum allowable delay time is the difference between the count in the transmission counter 13 and the count in the reception counter 24.

The time required for transmission is the time required for a packet to actually reach the wireless LAN terminal 3 after the timestamp has been applied to the packet by the transmission AV interface 10. Thus, the time required for transmission corresponds to, if the wireless LAN terminal 3 receives the packet and returns a response signal to the radio communication section 4, the difference between the count in the transmission counter 14 when the radio communication transmission section 4 receives the response signal and the timestamp of the packet.

Thus, a significant difference between the maximum allowable delay time and the time required for transmission indicates that the status of the wireless communication path is good and that the data is properly transmitted. In contrast, an insignificant difference indicates that the status of the wireless communication path is bad and that a long time is required to transmit the data. If the data is properly transmitted, the transmission path has a sufficient free capacity. Thus, an increase in transmission count does not prevent transmission of other data. Therefore, the maximum retransmission count is increased.

Figure 12:
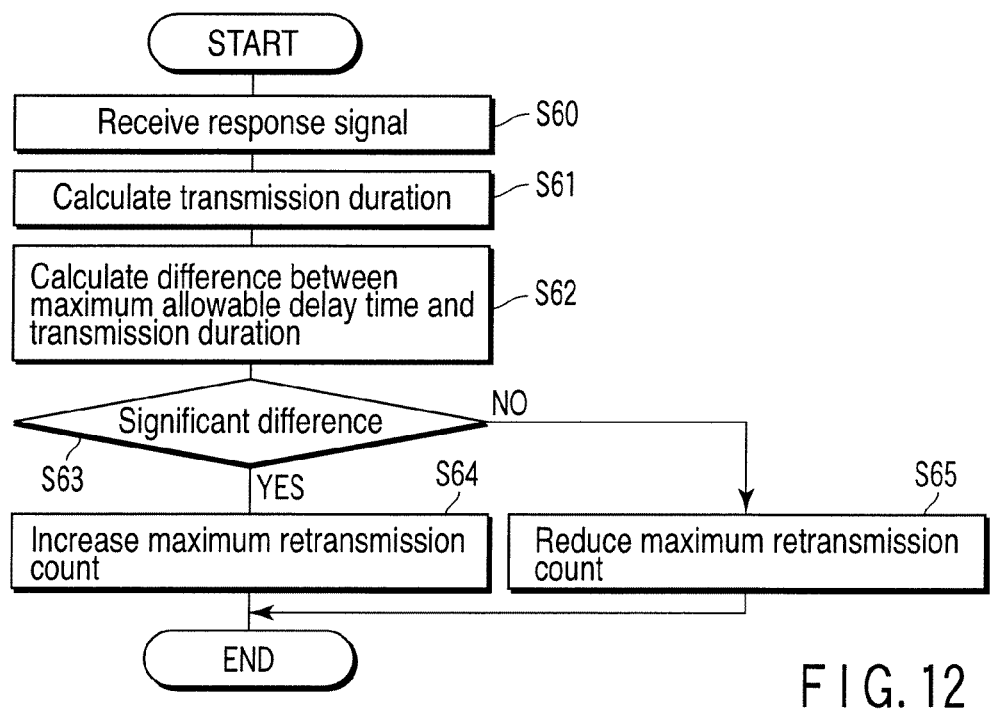
FIG. 12 is a flowchart of a method of processing video data in a radio communication transmission section according to the third embodiment.

The above-described processing is carried out by the transmission controller 13 in the radio communication transmission section 4. A flowchart in FIG. 12 shows the processing carried out by the transmission controller 13. As shown in FIG. 12, after the packet is transmitted to the wireless LAN terminal 3, the transmission communication processing section 12 receives the response signal from the wireless LAN terminal 3 (step S60). Then, the transmission controller 13 calculates the difference between the timestamp of the packet and the count in the transmission counter 13 obtained when the response signal is received, to determine the time required for transmission (step S61). Then, the transmission controller 13 calculates the difference between the maximum allowable delay time and the time required for transmission (step S62). The transmission controller 13 determines whether or not the difference obtained in step S62 is significant (step S13). This processing is carried out by, for example, comparison with a predetermined threshold. For a significant difference, the maximum retransmission count is increased (step S64). For an insignificant difference, the maximum retransmission count is reduced (step S65).

The above-described method can not only exert the effects described in the first and second embodiments but also improve data transmission efficiency.

As described above, the method of processing video data and the radio communication apparatus according to the first to third embodiments of the present invention, MPEG2-TS packets arriving at the video reproduction device later than the originally intended time are discarded without being input to the decoder. To achieve this, in the first embodiment, the MPEG2-TS reception device compares the timestamp applied to the packet with the count in the reception counter to determine whether or not the originally intended arrival time for the packet has elapsed. If the comparison result shows that the timestamp of the packet is smaller than the count, the originally intended arrival time for the packet is considered to have already elapsed. The packet is thus discarded.

Furthermore, the second embodiment determines the status of the reception buffer memory, and when the buffer memory becomes empty, determines whether or not the originally intended arrival time has elapsed. Specifically, the count corresponding to the length of time until the originally intended arrival time is subtracted from the current count in the transmission counter and the subtraction result is compared with the timestamp of the packet for determination. If the timestamp of the packet is smaller than the subtraction result, the originally intended arrival time for the packet is considered to have already elapsed. The packet is thus discarded and not transmitted to the video reproduction apparatus.

The above-described configuration can inhibit reproduced videos from being distorted by synchronization mismatch during video reproduction.

In the above-described first embodiment, the processing in step S19 is carried out by the reception AV interface 20. However, the processing may be carried out by, for example, the reception controller 23. In this case, if the condition in step S19 is met, the reception controller 23 instructs the reception AV interface 20 to output a packet.

Furthermore, the above-described first and second embodiments may take propagation delay in the radio communication reception section 8 into account. That is, the first and second embodiments may take into account the time from the reception of a packet by the reception communication processing section 22 until the actual output of the packet from the reception AV interface 20 via the reception buffer memory 21. This time is a design parameter for the radio communication reception section 8, which is a known parameter. This time $\tau$ [sec] can be converted into a count $\tau/(f \times 10^6)$ Thus, in step S21 in the first embodiment, the timestamp may be compared with the (reception count+$\tau/(f \times 10^6)$). Furthermore, in step S53 in the second embodiment, the timestamp may be compared with (C1−Dc+$\tau/(f \times 10^6)$). Furthermore, in the above-described embodiments, in steps S21 and S53, if the timestamp is smaller than the count, the data is discarded. However, the data may be discarded, for example, if the timestamp is equal to the count.

Moreover, in the first and second embodiments, some timing margin is preferably provided in order to reliably prevent the packet from being output later than the originally intended timing. That is, a predetermined margin is desirably subtracted from the value to be compared with the timestamp.

Moreover, since each of the count and the timestamp is a periodic value with a certain number of digits, the value returns to zero after exceeding the maximum allowable count. In this case, of course, the count needs to be consistently modified on both the reception and transmission sides. Furthermore, in the above-described embodiments, the counters 14 and 24 count up. However, the counters 14 and 24 may count down.

Figure 13:
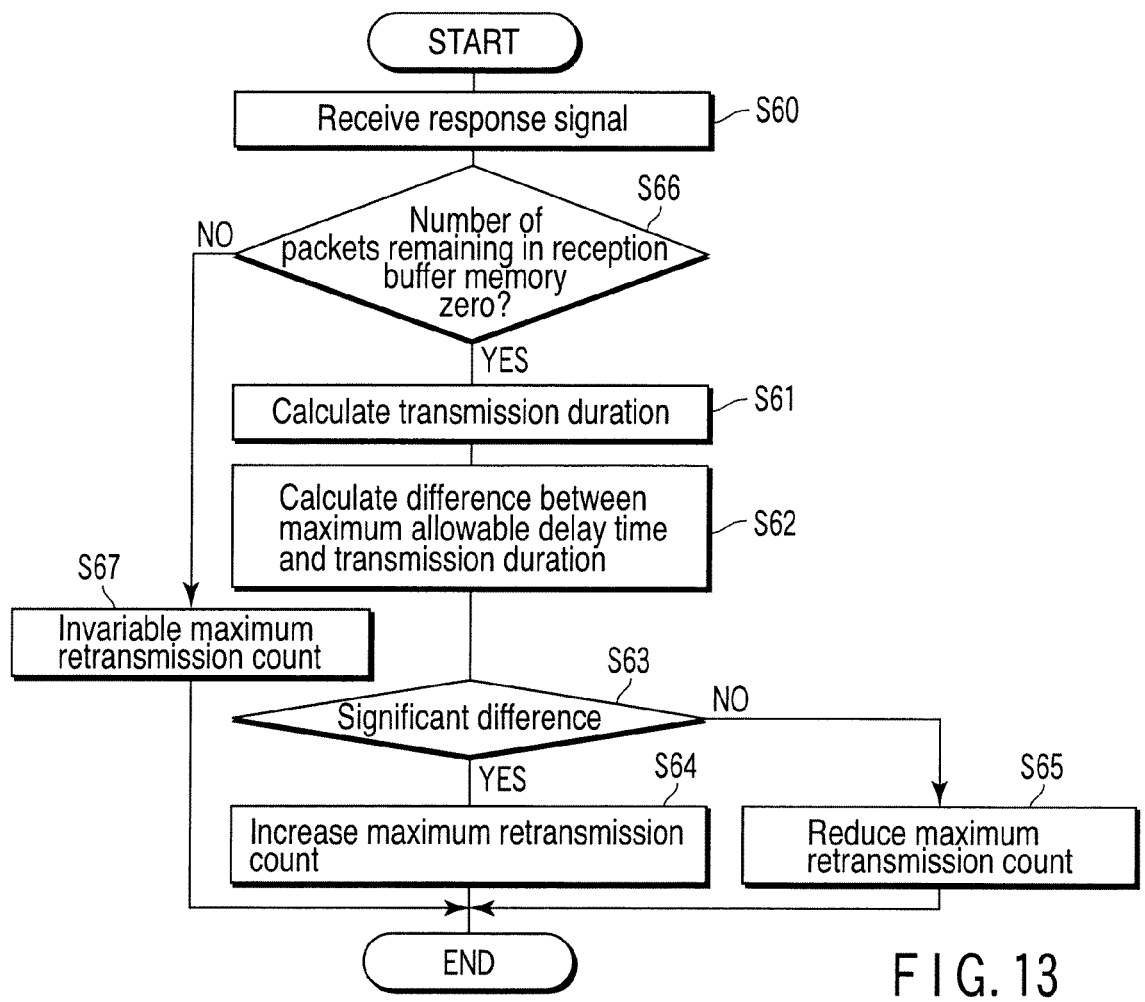
FIG. 13 is a flowchart of a method of processing video data in a radio communication transmission section according to a modification of the third embodiment.

Moreover, the processing described above in the third embodiment may be carried out only when the number of packets remaining in the reception buffer memory 21 reaches zero. FIG. 13 shows processing carried out by the transmission controller 13 in this case. As shown in FIG. 13, after step S60, the transmission controller 13 determines whether or not the number of packets remaining in the reception buffer memory is zero. This processing is similar to the processing in step S36, described in the second embodiment. If the number of packets remaining in the reception buffer memory is zero (step S66, YES), the process proceeds to step S61. If the number of packets remaining in the reception buffer memory is not zero (step S66, NO), the maximum retransmission count avoids being changed (step S67). With this method, when the wireless communication path is recovered to allow transmission of the packets having failed to be transmitted so far, opportunities when the packet arrives later than the originally intended time can be reduced. In this condition, a large number of packets the transmission of which has already been significantly delayed need to be transmitted, and the status of the wireless communication path has been improved. Thus, a large number of packets are preferentially transmitted as quickly as possible even with a reduced number of retransmissions.

Moreover, in the above-described first to third embodiments, if the number of packets remaining in the reception buffer memory 21 reaches zero, the transmission controller determines whether or not the reproduction time originally intended for the packet has elapsed. However, the above embodiments are not limited to the case where the number reaches zero. For example, the determination may be made when the number decreases below a threshold equal to or greater than zero. Furthermore, in the above description, the transmission controller determines whether or not the reproduction time originally intended for the packet has elapsed. However, the transmission controller may determine whether or not a predetermined delay threshold time before the originally intended reproduction time has elapsed. This may be achieved by replacing the count corresponding to the maximum allowable delay time in the first to third embodiments with a count corresponding to the predetermined delay threshold time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of processing video data using a wireless communication apparatus including a first buffer memory temporarily accumulating a plurality of video data to be transmitted over time by wireless communication and a reception device which reproduces the video data a predetermined delay time after reception, the method comprising:
  allowing a counter to start counting;
  applying a count in the counter to the video data to be transmitted, as a timestamp;
  accumulating the video data to which the timestamp is applied, in the first buffer memory;
  checking an amount of video data in a second buffer memory provided in the reception device to temporarily accumulate the received video data an amount of which corresponds to the delay time;
  determining whether or not a reproduction time for the video data has already elapsed, with reference to the timestamp of the video data accumulated in the first buffer memory if the amount of video data in the second buffer memory is smaller than a predetermined threshold; and
  discarding the video data without transmitting the video data if the reproduction time for the video data has elapsed,
  wherein the determining whether or not the reproduction time for the video data has already elapsed includes:
  calculating a count corresponding to the delay time,
  subtracting the count corresponding to the delay time from the count in the counter,
  determining whether or not the timestamp of the video data accumulated in the first buffer memory is smaller than a result of the subtraction, and
  determining that the reproduction time has elapsed if the value of the timestamp is smaller than the subtraction result and determining that the reproduction time has not elapsed if the value of the timestamp is greater than the subtraction result.

2. The method according to claim 1, further comprising:
  transmitting the video data to the reception device if the amount of video data in the second buffer memory is smaller than a predetermined threshold and the reproduction time has not elapsed;
  receiving a reception acknowledgement signal from the reception device having received the transmitted video data;
  calculating a time required for transmission of the video data on the basis of a difference between the timestamp of the transmitted video data and the count in the counter obtained when the reception acknowledgement signal is received;
  determining a wireless communication status on the basis of a difference between the delay time and the time required for transmission; and
  changing a maximum retransmission count for the video data according to the wireless communication status, and
  wherein if transmission of the video data fails, retransmission of the video data is repeated up to a number of times corresponding to the maximum retransmission count.

* * * * *